United States Patent
Pope et al.

(10) Patent No.: US 6,403,750 B1
(45) Date of Patent: \*Jun. 11, 2002

(54) APPARATUS AND PROCESS FOR MAKING CERAMIC COMPOSITES FROM PHOTO-CURABLE PRE-CERAMIC POLYMERS

(76) Inventors: Edward J. A. Pope, 447 Lorenzo Dr., Agoura; Kenneth M. Kratsch, 24621 El Camino Capistrano, Dana Point, both of CA (US) 91301

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,524

(22) Filed: Jun. 3, 1999

(51) Int. Cl.[7] ............................................... C08G 77/08
(52) U.S. Cl. .......................... 528/25; 528/32; 528/14; 556/430; 556/478
(58) Field of Search ................................ 556/430, 478; 528/32, 25, 14

(56) References Cited

U.S. PATENT DOCUMENTS 4,588,832 A * 5/1986 Ishihara et al. ............. 556/478
4,800,221 A * 1/1989 Marko ........................ 528/10
4,806,612 A * 2/1989 Chandra et al. ............. 528/10

OTHER PUBLICATIONS abstract, JP 6248084, Sep. 1994.*

* cited by examiner

Primary Examiner—Margaret G. Moore
(74) Attorney, Agent, or Firm—W. Edward Johansen (57) ABSTRACT

A process for fabricating ceramic composites employs a thermoplastic photo-curable pre-ceramic polymer in which the component is shape by a variety of standard composite fabrication techniques, such as filament winding, tape winding, and woven cloth winding. The process includes steps of passing ceramic fiber monofilament, tow, mat, or woven cloth through a solution of said thermoplastic photo-curable pre-ceramic polymer, applying ceramic fiber monofilament, tow, mat, or woven cloth to a moving flat substrate, using a compaction roller to press the thermoplastic pre-ceramic polymer coated ceramic fiber onto flat substrate, using photo-light of the ultraviolet, visible, or infrared light spectrum to induce cross-linking (curing) of the photo-curable pre-ceramic polymer thereby rendering a thermoset polymer and either partially or completely pyrolyzing the now cured pre-ceramic polymer matrix coated ceramic fiber material.

2 Claims, 1 Drawing Sheet

APPARATUS AND PROCESS FOR MAKING CERAMIC COMPOSITES FROM PHOTO-CURABLE PRE-CERAMIC POLYMERS

BACKGROUND OF THE INVENTION

The field of the invention is to the continuous manufacturer of fiber reinforced high temperature ceramic composites for use in military, commercial and industrial applications.

The synthesis of polycarbosilane from the pyrolytic condensation reaction of polydimethylsilane obtained from the reaction of dichlorodimethylsilane with an alkali metal, such as sodium. In the latter approach, polydimethylsilane can be prepared by Würtz type coupling of dichlorodimethylsilane with sodium in toluene. The direct pyrolysis of polydimethylsilane, a viscous thermoplastic resin, at high temperature gives SiC in a ceramic yield of about 30%–40%. By thermally cross-linking the polydimethylsilane into an infusible rigid thermoset polymer, which is insoluble in any common solvents, the subsequent pyrolysis yield is on the order of 88%–93%. This thermolysis was accomplished by refluxing the polydimethyl-silane to in excess of 350° C.

Numerous embodiments of pre-ceramic polymers with improved yields of the ceramic have been described in U.S. Pat. No. 5,138,080, U.S. Pat. No. 5,091,271, U.S. Pat. No. 5,051,215 and U.S. Pat. No. 5,707,471. The fundamental chemistry contained in these embodiments is specific to the process employed and mainly leaves the pre-ceramic polymer in a thermoplastic state. Embodiments that employ catalytic or photo induced crosslinking do not satisfy the high ceramic yield, purity, and fluidity in combination with low temperature crosslinking ability necessary for producing large densified ceramic structures in a single step continuous process.

U.S. Pat. No. 5,138,080 teaches a novel polysilamethylenosilane polymers which has polysilane-polycarbosilane skeleton which can be prepared in one-step reaction from mixtures of chlorosilaalkanes and organochloro silanes with alkali metals in one of appropriate solvents or in combination of solvents thereof. Such polysilamethyleno silane polymers are soluble and thermoplastic and can be pyrolyzed to obtain improved yields of silicon carbide at atmospheric pressure.

U.S. Pat. No. 5,091,271 teaches a shaped silicon carbide-based ceramic article which has a mechanical strength which is produced at a high efficiency by a process including the step of forming an organic silicone polymer, for example, polycarbosilastyrene copolymer, into a predetermined shape, for example, a filament or film; doping the shaped polymer with a doping material consisting of at least one type of halogen, for example, bromine or iodine, in an amount of 0.01% to 150% based on the weight of the shaped polymer, to render the shaped polymer infusible; and pyrolyzing the infusible shaped polymer into a shaped SiC-based ceramic article at a temperature of 800° C. to 1400° C. in an inert gas atmosphere, optionally the halogen-doped shaped polymer being treated with a basic material, for example, ammonia, before the pyrolyzing step, to make the filament uniformly infusible.

U.S. Pat. No. 5,300,605 teaches poly(I-hydro-I-R-1-silapent-3-ene) homopolymers and copolymers which contain silane segments with reactive silicon-hydride bonds and contain hydrocarbon segments with cis and trans carbon-carbon double bonds.

U.S. Pat. No. 5,171,810 teaches random or block copolymers with (I-hydro-I-I-sila-cis-pent-3-ene), poly(I-hydro-I-R-3,4 benzo-I-sila pent-3-ene) and disubstituted I-silapent-3-ene repeating units of the general formula ##STRI## where R is hydrogen, an alkyl radical containing from one to four carbon atoms or phenyl, $R^1$ is hydrogen, an alkyl radical containing from one to four carbon atoms, phenyl or a halogen and $R^2$ is hydrogen, or $R^1$ and $R^2$ are combined to form a phenyl ring, are prepared by the anionic ring opening polymerization of silacyclopent-3-enes or 2-silaindans with an organometallic base and cation coordinating ligand catalyst system or a metathesis ring opening catalyst system.

U.S. Pat. No. 5,169,916 Poly(I-hydro-I-R-I-sila-cis-pent-3-ene) and poly(I-hydro-I-R-3,4 benzo-I-sila pent-3-ene) polymers which has repeating units of the general formula polycarbosilane containing at least two tbd.SiH groups per molecule via intimately contacting such fusible polycarbosilane with an effective hardening amount of the vapors of sulfur.

U.S. Pat. No. 5,064,915 teaches insoluble polycarbosilanes, readily pyrolyzed into silicon carbide ceramic materials such as SiC fibers, are produced by hardening a fusible polycarbosilane containing at least two tbd.SiH groups per molecule via intimately contacting such fusible polycarbosilane with an effective hardening amount of the vapors of sulfur.

U.S. Pat. No. 5,049,529 teaches carbon nitride ceramic materials which are produced by hardening a fusible polycarbosilane containing at least two tbd.SiH groups per molecule by intimately contacting such fusible polycarbosilane with an effective hardening amount of the vapors of sulfur, next, heat treating the infusible polycarbosilane which results under an ammonia atmosphere to such extent as to introduce nitrogen into the infusible polycarbosilane without completely removing the carbon therefrom and then heat treating the nitrogenated polycarbosilane in a vacuum or in an inert atmosphere to such extent as to essentially completely convert it into a ceramic silicon carbon nitride.

U.S. Pat. No. 5,051,215 teaches a rapid method of infusibilizing pre-ceramic polymers which includes treatment of the polymers with gaseous nitrogen dioxide. The infusibilized polymers may be pyrolyzed to temperatures in excess of about 800° C. to yield ceramic materials with low oxygen content and, thus, good thermal stability. The methods are especially useful for the production of ceramic fibers and, more specifically, to the on-line production of ceramic fibers.

U.S. Pat. No. 5,028,571 teaches silicon nitride ceramic materials which are produced by hardening a fusible polycarbosilane containing at least two dbd.SiH groups per molecule by intimately contacting such fusible polycarbosilane with an effective hardening amount of the vapors of sulfur and then pyrolyzing the infusible polycarbosilane which results under an ammonia atmosphere.

U.S. Pat. No. 4,847,027 teaches a method for the preparation of ceramic materials or articles by the pyrolysis of pre-ceramic polymers wherein the pre-ceramic polymers are rendered infusible prior to pyrolysis by exposure to gaseous nitric oxide. Ceramic materials with low oxygen content, excellent physical properties, and good thermal stability can be obtained by the practice of this process. This method is especially suited for the preparation of ceramic fibers.

U.S. Pat. No. 5,714,025 teaches a method for preparing a ceramic-forming pre-preg tape which includes the steps of dispersing in water a ceramic-forming powder and a fiber, flocculating the dispersion by adding a cationic wet strength resin and an anionic polymer, dewatering the flocculated dispersion to form a sheet, wet pressing and drying the sheet, and coating or impregnating the sheet with an adhesive selected from the group consisting of a polymeric ceramic precursor, and a dispersion of an organic binder and the materials used to form the sheet. The tape can be used to form laminates, which are fired to consolidate the tapes to a ceramic.

U.S. Pat. No. 5,707,471 teaches a method for preparing fiber reinforced ceramic matrix composites which includes the steps of coating refractory fibers, forming the coated fibers into the desired curing the coated fibers to form a pre-preg, heating the pre-preg to form a composite and heating the composite in an oxidizing shape, environment to form an in situ sealant oxide coating on the composite. The refractory fibers have a interfacial coating thereon with a curable pre-ceramic polymer which has a char containing greater than about 50% sealant oxide atoms. The resultant composites have good oxidation resistance at high temperature as well as good strength and toughness.

U.S. Pat. No. 5,512,351 teaches a new pre-preg material which has good tack drape properties and feasible out-time. The pre-preg material is prepared by impregnating inorganic fibers with a compostion which includes a fine powder of a metal oxide or oxides having an average particle diameter of not larger than one micrometer, a soluble siloxane polymer having double chain structure, a trifunctional silane compound having at least one ethylenically unsaturated double bond in the molecule thereof, a organic peroxide and a radically polymerizable monomer having at least two ethylenically unsaturated double bonds and heating the impregnated fibers.

U.S. Pat. No. 4,835,238 teaches a reaction of 1,1-dichloro-silacyclobutanes with nitrogen-containing difunctional nucleophiles which gives polysilacyclobuta-silazanes which can be crosslinked and also converted to ceramic materials.

Numerous embodiments of processing mechanics with various direct applications have been described, for example, in the U.S. Pat. No. 5,820,483, U.S. Pat. No. 5,626,707, U.S. Pat. No. 5,732,743 and U.S. Pat. No. 5,698,055. The process mechanics are for a single product process and do not permit continuous curing and pyrolysis in a single step to produce highly dense thick ceramic components.

U.S. Pat. No. 5,820,483 teaches methods for manufacturing a shaft for a golf club. A plug is detachably affixed to a distal end of a mandrel. A plurality of plies of pre-preg composite sheet are wrapped around the mandrel and plug and, thereafter, heated causing the resin comprising the various plies to be cured. The mandrel is then removed from the formed shaft, leaving the plug as an integral part of the distal tip of the shaft.

U.S. Pat. No. 5,626,707 teaches an apparatus which produces a composite tubular article. The apparatus includes a frame, a drive mechanism for rotating a mandrel, at least two spindles mounted to the frame, a tensioner and a belt extending between the first and second spindles. The apparatus may be used to roll pre-preg strips or similar sheets of composite materials around the mandrel. The belt travels over the spindles, and the spindles guide the belt through changes in its direction of travel. The mandrel is mounted in the drive mechanism in contact with the belt, which changes its direction of travel around the mandrel. The lower surface of the belt bears against upper portions of the spindles, and the mandrel contacts the upper surface of the belt. As the drive mechanism rotates the mandrel, pre-preg sheets are fed between the mandrel and the belt and are thereby wrapped around the mandrel. The belt presses the pre-preg sheets against the mandrel. The wrapped mandrel may then be removed from the apparatus and cured in any suitable manner known in the art to produce the a composite tubular article.

U.S. Pat. No. 5,732,743 teaches a method for joining and repairing pipes includes the step of utilizing photo-curable resins in the form of a fabric patch to for quickly repairing or sealing pipes. A photo-curable flexible pre-preg fabric is wrapped over the entire area of the pipe to be joined or repaired. The pre-preg fabric contains multiple layers of varying widths and lengths. The pre-preg fabric is then exposed to photo-radiation which cures and seals the pipe.

U.S. Pat. No. 5,698,055 teaches a method for making a reinforced tubular laminate. A dry braided fiber sleeve is placed between a mandrel and spiral tape wrap either over, under, or layered with a pre-preg material. During the initial stages of the curing process, while the temperature is rising, the resin in the pre-preg material flows and wets out the dry braid. When the final cure takes place, the braid becomes an integral part of the finished laminate. The choice of fiber materials and braid angle permit various tubular laminate strengths. The selection of fiber colors and patterns permit a wide variety of tubular laminate aesthetic characteristics.

U.S. Pat. No. 5,632,834 teaches sandwich structures which are made of fiber-reinforced ceramics. The base substance of the ceramic matrix consists of a Si-organic polymer and a ceramic or metallic powder. A cross-linking of the Si-organic polymer takes place under increased pressure and at an increased temperature. After the joining of the facings and the honeycomb core, the sandwich structure is pyrolysed to form a ceramic material U.S. Pat. No. 5,641,817 teaches organometallic ceramic precursor binders which are used to fabricate shaped bodies by different techniques. Exemplary shape making techniques which utilize hardenable, liquid, organometallic, ceramic precursor binders include the fabrication of negatives of parts to be made (e.g., sand molds and sand cores for metalcasting, etc.), as well as utilizing ceramic precursor binders to make shapes directly (e.g., brake shoes, brake pads, clutch parts, grinding wheels, polymer concrete, refractory patches and liners, etc.). A thermosettable, liquid ceramic precursors provides suitable-strength sand molds and sand cores at very low binder levels and, upon exposure to molten metal casting exhibit low emissions toxicity as a result of their high char yields of ceramic upon exposure to heat. The process involves the fabrication of preforms used in the formation of composite articles. Production costs, and relatively poor physical properties prohibits their inherently large cost of capitalization, high wide use.

U.S. Pat. No. 4,631,179 teaches this ring-opening-polymerization reactions method to obtain a linear polymer of the formula $[SiH_2 CH_2]_n$. This polymer exhibit ceramics yields up to 85% on pyrolysis. The starting material for the ring-opening-polymerization reaction was the cyclic compound $[SiH_2 CH_2]_2$, which is difficult and costly to obtain in pure form by either of the procedures that have been reported.

U.S. Pat. No. 5,888,641 teaches an exhaust manifold for an engine which are made of all fiber reinforced ceramic matrix composite material so as to be light weight and high temperature resistant. A method of making the exhaust manifold includes the steps of forming a liner of a cast monolithic ceramic material containing pores, filling the pores of the cast monolithic ceramic material with a preceramic polymer resin, coating reinforcing fibers with an interface material to prevent a pre-ceramic polymer resin from adhering strongly to the reinforcing fibers, forming a mixture of a pre-ceramic polymer resin and reinforcing fibers coated with the interface material, forming an exhaust manifold shaped structure from the mixture of the pre-ceramic polymer resin and the reinforcing fibers coated with the interface material by placing the mixture on at least a portion of the cast monolithic ceramic material, and firing the exhaust component shaped structure at a temperature and a time sufficient to convert the pre-ceramic polymer resin to a ceramic thereby forming a reinforced ceramic composite.

U.S. Pat. No. 5,153,295 teaches compositions of matter which have potential utility as precursors to silicon carbide. These compositions are obtained by a Grignard coupling process starting from chlorocarbosilanes, a readily available class of compounds. The new precursors constitute a fundamentally new type of polycarbosilane that is characterized by a branched, [Si—C].sub.n "backbone" which consists of SiR.sub.3 CH.sub.2—,—SiR.sub.2 CH.sub.2—, .dbd.SiRCH.sub.2—, and .tbd.SiCH.sub.2—units (where R is usually H but can also be other organic or inorganic groups, e.g., lower alkyl or alkenyl, as may be needed to promote crosslinking or to modify the physical properties of the polymer or the composition of the final ceramic product). A key feature of these polymers is that substantially all of the linkages between the Si—C units are "head-to-tail", i.e., they are Si to C. The polycarbosilane "SiH.sub.2 CH.sub.2" has a carbon to silicon ratio of 1 to 1 and where substantially all of the substituents on the polymer backbone are hydrogen. This polymer consists largely of a combination of the four polymer "units": SiH.sub.3 CH.sub.2—, —SiH.sub.2 CH.sub.2—, .dbd.SiHCH.sub.2—, and .tbd.SiCH.sub.2— which are connected "head-to-tail" in such a manner that a complex, branched structure results. The branched sites introduced by the last two "units" are offset by a corresponding number of SiH.sub.3 CH.sub.2— "end groups" while maintaining the alternating Si—C "backbone". The relative numbers of the polymer "units" are such that the "average" formula is SiH.sub.2 CH.sub.2. These polymers have the advantage that it is only necessary to lose hydrogen during pyrolysis, thus ceramic yields of over 90% are possible, in principle. The extensive Si—H functionality allows facile crosslinking and the 1 to 1 carbon to silicon ratio and avoids the incorporation of excess carbon in the SiC products that are ultimately formed. The synthetic procedure employed to make them allows facile modification of the polymer, such as by introduction of small amounts of pendant vinyl groups, prior to reduction. The resulting vinyl-substituted "SiH.sub.2 CH.sub.2" polymer has been found to have improved crosslinking properties and higher ceramic yield.

A pre-ceramic polymer is prepared by a thermally induced methylene insertion reaction of polydimethylsilane. The resulting polymer is only approximately represented by the formula [SiHMeCH.sub.2].sub.n, as significant amounts of unreacted (SiMe.sub.2).sub.n units, complex rearrangements, and branching are observed. Neither the preparation nor the resulting structure of this precursor is therefore similar to the instant process. In addition to the carbosilane "units", large amounts of Si—Si bonding remains in the "backbone" of the polymer. This polymer, in contrast to the instant process, contains twice the stoichiometric amount of carbon for SiC formation. The excess carbon must be eliminated through pyrolytic processes that are by no means quantitative. Despite the shortcomings, this polymer has been employed to prepare "SiC" fiber. However, it must be treated with various crosslinking agents prior to pyrolysis which introduce contaminants. This results in a final ceramic product that contains significant amounts of excess carbon and silica which greatly degrade the high temperature performance of the fiber.

SiC precursors predominately linear polycarbosilanes have been prepared via potassium dechlorination of chloro-chloromethyl-imethylsilane. The resulting polymers have not been fully characterized, but probably contain significant numbers of Si—Si and CH.sub.2—CH.sub.2 groups in the polymer backbone. The alkali metal dechlorination process used in the synthesis of such materials does not exhibit the selective head-tail coupling found with Grignard coupling. The pendant methyl groups in such materials also lead to the incorporation of excess carbon into the system. In several polymer systems mixtures containing vinylchlorosilanes (such as CH.sub.2 .dbd.CH—Si(Me)Cl.sub.2) and Me.sub.2 SiCl.sub.2 are coupled by dechlorination with potassium in tetrahydro-furan. U.S. Pat. No. 4,414,403 and U.S. Pat. No. 4,472,591 both teach this method. The "backbone" of the resulting polymers consists of a combination of Si—Si and Si—CH.sub.2 CH(—Si).sub.2 units. Later versions of this polymer Me(H)SiCl.sub.2 in addition to the Me.sub.2 SiCl.sub.2, and are subjected to a sodium-hydrocarbon dechlorination process which does not attack vinyl groups. The resulting polymer consists of a predominately linear, Si—Si "backbone" bearing pendant methyl groups, with some Si—H and Si—CH.dbd.CH.sub.2 functionality to allow crosslinking on pyrolysis.

None of these precursors derived using vinylchlorosilanes are similar to those of the process in that having predominantly Si—Si bonded "backbones", they are essentially polysilanes, not polycarbosilanes. In addition, the carbon in these polymers is primarily in the form of pendant methyl functionality and is present in considerable excess of the desirable 1 to 1 ratio with silicon. The ceramic products obtained from these polymers are known to contain considerable amounts of excess carbon.

Polymeric precursors to SiC have been obtained by redistribution reactions of methyl-chloro-disilane (Me.sub.6-x Cl.sub.x Si.sub.2, x=2–4) mixtures, catalyzed by tetraalkyl-phosphonium halides which U.S. Pat. No. 4,310,481, U.S. Pat. No. 4,310,482 and U.S. Pat. No. 4,472,591 teach. In a typical preparation, elemental analysis of the polymer was employed to suggest the approximate formula [Si(Me).sub.1.15 (H).sub.0.25].sub.n, with n averaging about 20. The reaction is fundamentally different than that involved in the process and the structures of the polymers are also entirely different, involving what is reported to be a complex arrangement of fused polysilane rings with methyl substitution and a polysilane backbone.

The formation of carbosilane polymers with pendent methyl groups as by-products of the "reverse-Grignard" reaction of chloromethyl-dichloro-methylsilane. The chief purpose of this work was the preparation of carbosilane rings and the polymeric byproduct was not characterized in detail nor was its use as a SiC precursor suggested. Studies of this material indicate that it has an unacceptably low ceramic yield on pyrolysis. These polymers are related to those described in the instant process and are obtained by a similar procedure, however, they contain twice the required amount carbon necessary for stoichiometric silicon carbide and their use as SiC precursors was not suggested. Moreover, the starting material, chloromethyl-dichloro-methylsilane, contains only two sites on the Si atom for chain growth and therefore cannot yield a structure which contains .tbd.SiCH.sub.2—chain units. On this basis, the structure of the polymer obtained, as well as its physical properties and pyrolysis characteristics, must be significantly different from that of the subject process.

U.S. Pat. No. 4,631,179 teaches a polymer which is a product of the ring-opening polymerization of $(SiH_2CH_2)_2$ also has the nominal composition "$SiH_2CH_2$". However, the actual structure of this polymer is fundamentally and functionally different from that of the instant process. Instead of a highly branched structure comprised of $SiR_3CH_2-$, $-SiR_2CH_2-$, $.dbd.SiRCH_2-$, and $.tbd.SiCH_2-$ units, the Smith polymer is reported to be a linear polycarbosilane which presumably has only $[SiH_2CH_2]$ as the internal chain segments. Such a fundamental structural difference would be expected to lead to quite different physical and chemical properties. The fundamental difference in these two structures has been verified by the preparation of a linear polymer analogous to polymer and the comparison of its infrared and H-NMR spectra.

Another important difference between the process of Smith and the instant process is the method used to obtain the product polymer and the nature of the starting materials. The $[SiH_2CH_2]_2$ monomer used by Smith is difficult and expensive to prepare and not generally available, whereas the chlorocarbosilanes used in the instant process are readily available through commercial sources.

U.S. Pat. No. 4,923,716 teaches chemical vapor deposition of silicon carbide which uses a "single molecular species" and provides reactive fragments containing both silicon and carbon atoms in equal number this process. Linear and cyclic structures of up to six units are mentioned. These compounds, which include both silanes and carbosilanes, are specifically chosen to be volatile for chemical vapor deposition use, and are distinctly different from the instant process, where the products are polymers of sufficiently high molecular weight that they cross-link before significant volatilization occurs. Such volatility would be highly undesirable for the applications under consideration for the polymers of the instant process, where excessive loss of the silicon-containing compound by vaporization on heating would be unacceptable.

SUMMARY OF THE INVENTION

The present invention is generally directed to a process of forming a photo-curable pre-ceramic polymer for use in for fabricating ceramic matrix composites.

In a first separate aspect of the invention the process includes the steps to silicon carbide ceramic In a second separate aspect of the invention the process includes the steps of reacting sodium acetylide with organo-chlorosilanes and condensing (polymerizing) the resultant organo-(ethynyl)-chloro silane product of step a with an excess of an alkali metal. The process includes the steps preparing a solution of thermoplastic photo-curable pre-ceramic polymer, passing a fiber, tape or fabric through the solution of thermoplastic photo-curable pre-ceramic polymer, applying the pre-preg to a shaped mandrel, using light energy to induce cross-linking of said photo-curable pre-ceramic polymer after application to said mandrel whereby said thermoplastic pre-ceramic polymer is cured and pyrolyzing said cured thermoplastic pre-ceramic polymer matrix composite material.

In a third separate aspect of the invention a single-step process for fabricating continuous ceramic fiber ceramic matrix composites employs a thermoplastic photo-curable pre-ceramic polymer in which the component is shaped by a variety of standard composite fabrication techniques, such as filament winding, tape winding, and woven cloth winding. The process includes steps of passing ceramic fiber monofilament, tow, mat, or woven cloth through a solution of the thermoplastic photo-curable pre-ceramic polymer, applying ceramic fiber monofilament, tow, mat, or woven cloth to a shaped mandrel, using photo-energy of the ultraviolet, visible or infrared light spectrum to induce cross-linking (curing) of the photo-curable pre-ceramic polymer after application to said mandrel and either partially or completely pyrolyzing the now cured pre-ceramic polymer matrix composite material.

Other aspects and many of the attendant advantages will be more readily appreciated as the same becomes better understood by reference to the following detailed description.

The features of the present invention which are believed to be novel are set forth with particularity in the appended claims.

DESCRIPTION OF THE PREFERRED EMBODIMENT

A continuous single step manufacturing process for fabricates dense low-porosity composites using novel cross-linkable pre-ceramic polymers and simple plastic industry technology adapted to the thermoset capability of the pre-ceramic polymer. The process eliminates the multi-cycle polymer impregnation pyrolysis method. The process is a simple controllable production process for fiber reinforced ceramic matrix composites, which can be easily automated into large manufacturing continuous processes. This process combines high-yield cross-linkable pre-ceramic polymers and a single step automated process mechanism to produce ceramic components on the scale of aircraft fuselages, boat hulls, and large single ceramic sheets for space vehicle skin panels. The process provides chemically modified pre-ceramic polymers which are very fluid at temperatures 60° C.–100° C., have high ceramic yields by weight of 75–95%, exhibit high purity and can be crosslinked into a thermoset with ultraviolet radiation. The process achieves by a series of chemical substitutions using commercially available polymers to incorporate ethynyl side groups on the polymers, which then contain unstable carbon triple bonds and cross-link, by hydrosilylation with Si—H groups upon photo-exposure. The process is to use the chemical substitution ethynyl side group chemistry to produce SiC, Si3N4, AL2O3 and AL3N4 and TiC upon pyrolysis after photo-exposure. Conversion of precursor polymers like polycarbosilane and polysilazane to poly(ethynyl)-carbosilane and poly(ethynyl)silazane achieve this objective. The process draws a fiber, tape, fabric, woven cloth onto a mandrel or suitable substrate by first passing it through the chemically modified pre-ceramic polymer. The objective of this process is to saturate the fiber, tape, fabric, woven cloth with the very fluid pre-ceramic polymer and then photo-cure it on the mandrel or substrate as the saturated material is drawn along by motorized winding or pulling mechanisms known to the prior art. The process provides a continuous fabrication process to enable making a dense (total porosity <8%) fiber reinforced ceramic composite in a single step. This objective is achieved by compacting each layer of pre-ceramic polymer saturated material onto the already pyrolyzed layer below permitting excess polymer to impregnate this layer. The back-fill allowed here reduces the final component porosity, increases strength and provides a short path for volatiles to escape mitagating interlayer delamination. This layer by layer buildup is continued until the required component thickness is reached.

Figure 1:
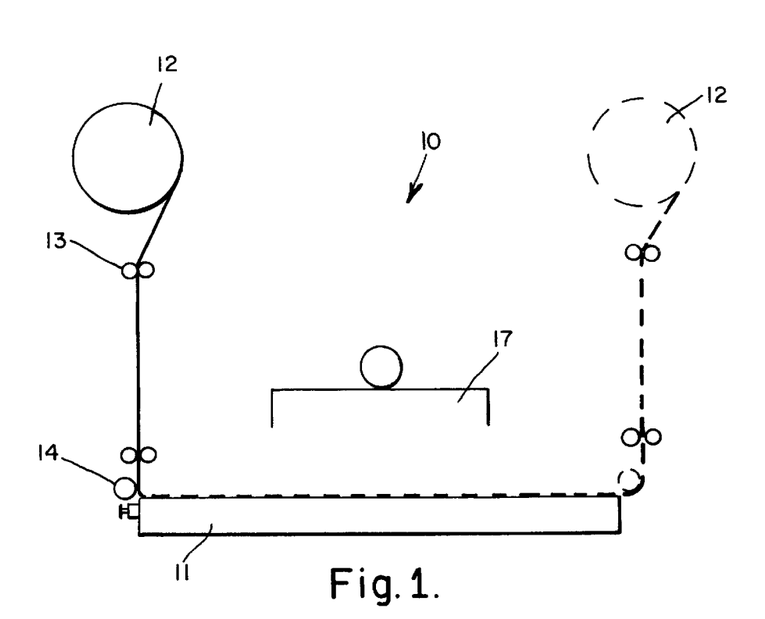
FIG. 1 is schematic drawing of an apparatus for making flat plates of ceramic composites from photo-curable pre-ceramic polymers according to the first embodiment.
Figure 2:
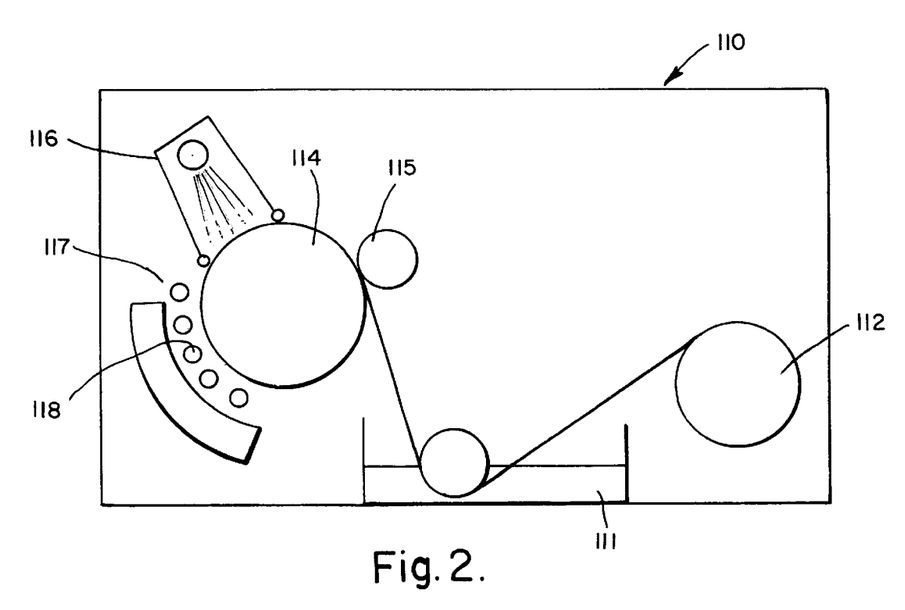
FIG. 2 is schematic drawing of an apparatus for making cylinders of ceramic composites from photo-curable pre-ceramic polymers according to the second embodiment.

Referring to FIG. 1 in conjunction with FIG. 2 an apparatus 10 for making flat plates of ceramic composites from photo-curable pre-ceramic polymers includes a frame 11 with a process bed, a set of fabric rollers 12, a set of guide rollers 13, a set of drive rollers 14, a drive motor 15, a compression roller 16, a process head 17 having a light-emitting lamp, a furnace 18, a covering 19 and a source of inert gas and a control panel 20. The source of inert gas provides an inert atmosphere.

Referring to FIG. 3 in conjunction with FIG. 4 an apparatus 110 for making clyinders of ceramic composites from photo-curable pre-ceramic polymers includes a dry nitrogen environmental chamber 111, a fabric roller 112, an applicator 113 of a photo-curable pre-ceramic polymer, a take-up mandrel 114, a pressure loaded compaction roller 115, a light-emitting lamp 116 and a consolidation and pyrolysis zone 117. The consolidation and pyrolysis zone 117 has a heater 118. The fabric roller dispenses woven ceramic fabric.

Commercially available polycarbosilanes and polycarbosiloxane polymers could be rendered photo-curable, by high intensity photo-radiation, through the addition of ethynyl side groups to the polymer. The polymer, poly(ethynyl) carbosilane, is rendered into an infusible thermoset upon photo-radiation. The process is able to similarly elevate ceramic yields to ~85% by weight.

It has been demonstrated that various combinations of di-functional and tri-functional silane precursors can be utilized to enhance cross-linking and elevate ceramic yield. Combinations of dichlorodimethylsilane (di-functional) and trichlorophenylsilane (tri-functional) can be employed. Through the addition of branching, or cross-linking, ceramic yields as high as 77% have been obtained. Further, it is possible to doped these polymers, with boron for example, to control sintering and crystallization behavior.

While this process allows the addition of ethynyl side groups to potentially a wide range of available pre-ceramic polymers, there are other methods of directly synthesizing poly(ethynyl)carbosilane, which are outlined below. In both of the following reaction paths, tri-functional organotrichlorosilanes are utilized, in part or in entirety, to permit the introduction of photo-polymerizible side-groups, such as ethynyl groups derived from the reaction of sodium acetylide with chlorosilane.

In the first reaction route, sodium acetylide is reacted with the organotrichlorosilane, such as a methyl- or phenyltrichlorosilane, as shown in step 1. Typically, this is performed in a solvent, such as hexane or methylene chloride. The by-product of this reaction is sodium chloride, which is insoluble and can be easily removed by filtration and/or sedimentation (step 2). The resulting organo(ethynyl) chlorosilane can be reacted directly with sodium which is a Würtz type condensation reaction or mixed with an organodichlorosilane prior to the initiation of polycondensation.

Assuming that all "R"s are the same, and "a+b=1", then the following reaction path can be proposed:

TABLE 1

New processing route 1: Steps and reaction chemistries to form poly(ethynyl)carbosilane - Final Product = $1/n\{SiR_{(a+2b)}C\equiv CH_{ag}\}_n$.

| Processing Step | Reaction |
|---|---|
| 1. The addition of ethynyl (acetylide) side groups to tri-functional polysilazane reactant. | a {RSiCl$_3$ + g NaC≡CH → RSiCl$_{(3-g)}$C≡CH$_g$ + g NaCl} |
| 2. Remove NaCl by filtration. | − ag NaCl |
| 3. The addition of di-functional chain former (optional). | + b {R$_2$SiCl$_2$} |
| 4 Condensation of modified precursor solution to produce poly(ethynyl)silazane pre-ceramic polymer through the addition of sodium. | a(RSiCl$_{(3-g)}$C≡CH$_g$) + b(R$_2$SiCl$_2$) + 2[a(3-g) + b]Na → 1/n{Si$_{(a+b)}$R$_{(a+2b)}$C≡CH$_{ag}$}$_n$ + 2[a(3-g)+b]NaCl |

In route 1, the photo-cross-linkable ethynyl group (acetylide) is added prior to the initiation of Würtz type condensation reaction. In route 2, a method of adding ethynyl side-groups post-condensation, thereby avoiding the exposure of the ethynyl ligand to sodium during the pre-ceramic polymer synthesis is disclosed. In this process, tri-functional and/or a mixture of di-functional and tri-functional chlorosilanes are reacted with a sub-stoichiometric quantity of metallic sodium, sufficient to bring about an increase in molecular weight and viscosity of the now pre-ceramic polymer backbone, but leaving a fraction of the chlorosilane reaction sites unreacted. The resulting sodium chloride by-product can be removed by filtration and/or sedimentation (step 2).

Following polymer condensation, with unreacted chlorosilane sites intact, excess sodium acetylide is added to react with the aforementioned unreacted sites to produce poly(ethynyl)carbosilane photocurable pre-ceramic polymer. The poly(ethynyl)carbosilane pre-ceramic polymer can be retrieved by solvent evaporation by the application of heat and/or in vacuo. Assuming that all "R"s are the same, and "a+b=1", the final desired reaction product is expressed in the reaction path below in Table 2.

TABLE 2

New processing route 2: Steps, and reaction chemistries, to form poly(ethynyl)carbosilane.

| Processing Step | Reaction |
|---|---|
| 1. Mixture of di-functional and tri-functional chlorosilames reacted with a sub-stoichiometric amount of sodium (where y<[3a+2b]). | a(RSiCl$_3$) + b(R$_2$SiCl$_2$) + [y/(3a+2b)]Na → (1/n){Si$_{(a+b)}$R$_{(a+2b)}$Cl$_{[(1-y)/(3a+2b)]}$}$_n$ + [y/3a+2b)] NaCl |
| 2. Remove NaCl by filtration and/or sedimentation. | −[y/3a+2b)] NaCl |
| 3. Addition of ethynyl side groups to partially condensed polysilazane polymer through the addition of excess sodium acetylide. | (1/n){Si$_{(a+b)}$R$_{(a+2b)}$Cl$_{[(1-y)/(3a+2b)]}$}$_n$ + [(1−y)/(3a+2b)]NaC≡CH → (1/n) {Si$_{(a+b)}$R$_{(a+2b)}$ C≡CH$_{[(1-y)/(3a+2b)]}$}$_n$ + [(1−y)/(3a+2b)]NaCl |

Product = $(1/n)\{SiR_{(a+2b)} C\equiv CH_{[(1-y)/(3a+2b)]}\}_n$.

Product = $(1/n)\{SiR_{(a+2b)} C\equiv CH_{[(1-y)/(3a+2b)]}\}_n$.

In the previous section, the method of preparing poly (ethynyl)carbosilane, a photo-curable pre-ceramic polymer precursor to silicon carbide has been reviewed. In this section, several of the promising methods of synthesizing polysilazane precursors to silicon nitride (Si$_3$N$_4$) and a method of conversion to poly(ethynyl)silazane, a photo-curable pre-ceramic polymer precursor to high yield $Si_3N_4$/SiC ceramic matrix composites are described. $Si_3N_4$ doped with 10–15 weight percent SiC has significantly lower creep at high temperature than pure $Si_3N_4$. The creep rate at the minumum was lower by a factor of three than that of the unreinforced, monolithic matrix of equal grain size. Thus, other researchers have recognized the potential importance of $Si_3N_4$/SiC nanocomposite matrices for continuous ceramic fiber reinforced composites used in high temperature applications. Two advantages of the process of the process are the ability to fabricate large-scale composites employing existing polymer composite fabrication techniques due to the addition of the photo-cross-linkable ethynyl side-groups and the inclusion of the carbon containing ethynyl group should lead to the addition of approximately 5 to 20 weight percent SiC upon pyrolysis.

One of the simplest and direct methods of preparing polysilazane precursors to silicon nitride, with a 70 weight percent ceramic yield is to dissolve dichlorosilane in dichloromethane solvent. Pyrolysis in flowing nitrogen gas yielded nearly phase pure a-$Si_3N_4$ after heat treatment at 1150° C. for 12 hours. Numerous other permutations and refinements to the preparation of polysilazane oils and polymers have been developed. The reaction path of polysilazane formation using dichlorosilanes and ammonia is set out below:

A number of the most direct permutations include the use of trichlorosilanes, methyltrichlorosilanes, dimethyidichlorosilanes, and vinyl-, butyl-, phenyl-, ethyl-, and hexyl- modified chlorosilanes. Increased molecular weight, and correspondingly increased ceramic yield, can be achieved by catalytically enhancing the cross-linking during final polymer preparation. A number of novel methods, including the use of ruthenium compounds and potassium hydride, have been demonstrated to give ceramic yields upon pyrolysis as high as 85 percent. The inducement of cross-linking prior to pyrolysis is essential to achieving the high ceramic yields necessary to large-scale commercialization of $Si_3N_4$ matrix composites for high temperature applications. The cross-linking methods cited in the literature, however, are chemical catalysts, making the shaping and forming processes extremely difficult.

A ceramic matrix of predominantly silicon nitride with about 10–15% SiC by weight is nearly ideal for fabricating CMCs. In addition, the catalytic cross-linking of the polysilazane precursor dramatically increases ceramic yield. The synthesis route should produce high yield $Si_3N_4$/SiC nanocomposites employing a photocurable pre-ceramic polymer precursor.

One possible method would be to synthesize the unmodified polysilazane through the ammonolysis of various chlorosilane reactants in dichloromethane solvent followed by modifying the resulting polysilazanes, using a previously described process of chlorination followed by attachment of the ethynyl through reaction with sodium acetylide.

Another alternative approach starts with a variety of dichloro- and/or trichlorosilanes and reacts them with sodium acetylide at various concentrations, followed by ammonolysis to result in the final poly(ethynyl) silazane precursor as specifically detailed in the Table 3 below:

TABLE 3

Processing steps and reaction chemistries to form poly(ethylnyl)silazane

| Processing Step | Reaction |
| --- | --- |
| 1. addition of acetylide side groups trifunctional polysilazane reactant. | a $\{RSiCl_3 + g\ NaCCH \rightarrow RSiCl_{(3-g)}CCH_g + g\ NaCl\}$ |
| 2. remove NaCl by filtration | $- g\ NaCl$ |
| 2. addition of difunctional chain former | b $\{R_2SiCl_2\}$ |
| 3. ammonolysis of modified precursor solution to produce poly(ethynyl)silazane pre-ceramic polymer | a $[RSiCl_{(3-g)}CCH_g] + b\ [R_2SiCl_2] + NH_3 \rightarrow b\{[SiR_2(NH)]_n\} + a\{[RSi(NH)_{(3-g)}CCH_g]_m\} + 2[a(3-g) + 2b]NH_4Cl$ |

The following are examples of combining commercially available polymers and catalysts to achieve a final photo-curable pre-ceramic polymer to SiC ceramics. In order to be photo-curable, the polymer requires either double-bonded carbons such as Allyl side groups or triple-bonded carbons such as acetylide or propargyl side groups. The catalysts can include a thermally curable component such as benzoil peroxide and a photo-curable initiator such as Ciba-Geigy's Irgacure 1800™ or a combination of camphorquinone and 2-(dimethylamino)-ethyl methacrylate).

EXAMPLE 1

| Category | Compound | Amount (grams) |
| --- | --- | --- |
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.02 |
| Photoinitiator 2 | None | None |

EXAMPLE 2

| Category | Compound | Amount (grams) |
| --- | --- | --- |
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.02 |
| RT initiator | N,N-dihydroxyparatoluidine | 0.02 |

EXAMPLE 3

| Category | Compound | Amount (grams) |
| --- | --- | --- |
| Polymer | Allylhydridopolycarbosilane (5% allyl groups) | 2.0 |
| Catalyst | Benzoil Peroxide | 0.02 |
| Photoinitiator 1 | Ciba-Geigy's Irgacure 1800 | 0.01 |
| Photoinitiator 2 | none | None |

EXAMPLE 4

| Category | Compound | Amount (grams) |
|---|---|---|
| Polymer | Poly(ethynyl)carbosilane | 2.0 |
| Catalyst | Benzoil Peroxide | 0.02 |
| Photoinitiator 1 | Ciba-Geigy's Irgacure 1800 | 0.02 |
| Photoinitiator 2 | none | None |

EXAMPLE 5

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Camphorquinone | 0.02 |
| Photoinitiator 2 | 2-(dimethylamino)ethyl methacrylate. | 0.02 |

EXAMPLE 6

| Category | Compound | Amount (grams) |
|---|---|---|
| Polymer | Poly(ethynyl)carbosilane | 2.0 |
| Catalyst | Benzoil Peroxide | 0.02 |
| Photoinitiator 1 | Camphorquinone | 0.02 |
| Photoinitiator 2 | 2-(dimethylamino)ethyl methacrylate. | 0.02 |

EXAMPLE 7

| Category | Compound | Amount (grams) |
|---|---|---|
| Polymer | Allylhydridopolycarbosilane (5% allyl groups) | 2.0 |
| Catalyst | Benzoil Peroxide | None |
| Photoinitiator 1 | Camphorquinone | 0.02 |
| Photoinitiator 2 | 2-(dimethylamino)ethyl methacrylate. | 0.02 |

EXAMPLE 8

| Category | Compound | Amount (grams) |
|---|---|---|
| Polymer | Allylhydridopolycarbosilane (5% allyl groups) | 2.0 |
| Catalyst | Benzoil Peroxide | 0.02 |
| Photoinitiator 1 | Camphorquinone | 0.01 |
| Photoinitiator 2 | 2-(dimethylamino)ethyl methacrylate). | 0.01 |

EXAMPLE 9

| Category | Compound | Amount (grams) |
|---|---|---|
| Polymer | Allylhydridopolycarbosilane (5% allyl groups) | 2.0 |
| Catalyst | Benzoil Peroxide | none |
| Photoinitiator 1 | Camphorquinone | 0.01 |
| Photoinitiator 2 | 2-(dimethylamino)ethyl methacrylate). | 0.01 |

All of the above examples cross-linked under photo-irradiation (using either ultraviolet light or blue light as indicated) within a few minutes to an hour under continuous irradiation at room temperature. The samples were transformed by this method from thermoplastic to thermoset pre-ceramic polymers which did not flow or deform significantly upon subsequent heat-treatment and pyrolysis, ultimately yielding SiC containing ceramics. The examples are meant to be illustrative. A person trained in the art can easily modify the ratios and selection of both pre-ceramic polymer and/or photo-initiators and catalyst combinations.

This process enables the continuous manufacture of fiber reinforced ceramic composites by the use of high ceramic yield pre-ceramic polymers which are photo-curable to a thermoset from a thermoplastic state. A composite in any form or shape is fabricated by photocuring each individual layer of fiber with in-situ pyrolysis of the pre-ceramic polymer impregnated into the fiber layer. The layer by layer of fiber, fabric or woven cloth is pressure loaded to press the thermoplastic polymer infiltrated fabric onto the mandrel or flat substrate thereby permitting excess polymer to impregnate the porous, already pyrolyzed, layer below. This single step process allows a shorter mean free path for volatiles to escape with less destruction then the removal of organics from more massive parts, for consolidation of each layer individually, and for increased layer to layer bonding and improved interlaminar shear strengths.

Silicon carbide (SiC) is one of several advanced ceramic materials which are currently receiving considerable attention as electronic materials, as potential replacements for metals in engines, and for a variety of other applications where high strength, combined with low density and resistance to oxidation, corrosion and thermal degradation at temperatures in excess of 1000° C. are required. Unfortunately, these extremely hard, non-melting ceramics are difficult to process by conventional forming, machining, or spinning applications rendering their use for many of these potential applications problematic. In particular, the production of thin films by solution casting, continuous fiber by solution or melt spinning, a SiC matrix composite by liquid phase infiltration, or a monolithic object using a precursor-based binder/sintering aid, all require a source of SiC which is suitable for solution or melt processing and which possesses certain requisite physical and chemical properties which are generally characteristic of polymeric materials.

Polymeric precursors to ceramics such as SiC afford a potential solution to this problem as they would allow the use of conventional processing operations prior to conversion to ceramic. A ceramic precursor should be soluble in organic solvents, moldable or spinnable, crosslinkable, and give pure ceramic product in high yield on pyrolysis. Unfortunately, it is difficult to achieve all these goals simultaneously. Currently available SiC precursor systems are lacking in one or more of these areas. Problems have been encountered in efforts to employ the existing polysilane and polycarbosilane precursors to SiC for preparation of SiC fiber and monolithic ceramic objects. All of these precursors have C/Si ratios considerably greater than one, and undergo a complex series of ill-defined thermal decomposition reactions which generally lead to incorporation of excess carbon. The existence of even small amounts of carbon at the grain boundaries within SiC ceramics has been found to have a detrimental effect on the strength of the ceramic, contributing to the relatively low room-temperature tensile strengths typically observed for precursor-derived SiC fibers.

Efforts to develop polymeric precursors to SiC have focused largely on two types of polymers, polysilanes, which have a Si—Si backbone, and polycarbosilanes, in which the polymer backbone is [—Si—C—]$_n$. The polysilanes all suffer from problems due to insolubility, infusibility and/or excess carbon incorporation. Certain of the polycarbosilanes have more suitable physical properties for processing; however, in general, these also contain a higher-than- 1:1 C:Si ratio and incorporate excess carbon on pyrolysis.

In the case of the polycarbosilanes, high molecular weight linear polymers of the type [R$_2$ SiCH$_2$]$_n$, where R is H and/or hydrocarbon groups, have been prepared by ring-opening-polymerizabon reactions starting from cyclic disilacyclobutanes using chloroplatinic acid and related catalyst systems; however, such linear polycarbosilanes generally exhibit low yields of ceramic product on pyrolysis due to chain "unzipping" reactions. For example, studies of high molecular weight [Me$_2$ SiCH$_2$]$_n$ polymers have indicated virtually complete volatilization on pyrolysis under an inert atmosphere to 1000° C.

Use of propargyl groups (HC-=CCH2-), such as propargyl chloride (HC=CCH2Cl), propargyl bromide (HC=_CCH2Br), propargyl alcohol (HC=_CCH2OH), propargyl magnesium chloride (HC=_CCH2MgCl), propargyl calcium chloride (HC=_CCH2CaCl), propargyl amine (HC=_CCH2NH2), and other propargyl containing species introduces the photo-curable (Cross-linkable) triple-bonded carbon linkages into the pre-ceramic polymer.

U.S. Pat. No. 5,153,295 teaches the use of ceramic polymers with an Si—C backbone structure, such as allyl-hydridopolycarbosilane (AHPCS), formed from the Grignard coupling reaction of a halomethylcarbosilane followed by reduction using a metal hydride in which either a UV cross-linkable ethynyl (i.e. acetylide) or propargy]. group has been introduced into the polymer by methodologies described previously.

The use of other ethynyl containing reagents, such as 1-ethynyl-1-cyclohexanol and 1,1'-ethynylenedicyclohexanol, can be directly coupled, due to the presence of hydrolyl (OH) bonds, to either halosilane (Si—X, where X=F, Cl, Br) and/or silanol (Si—OH) groups in the pre-ceramic polymer.

The use of benzoil peroxide or other chemical catalysts in conjunction with double or triple bonded carbon side groups within the pre-ceramic polymer to achieve crosslinking.

A single-step fabrication process of continuous ceramic fiber ceramic matrix composites employs a thermoplastic photo-curable pre-ceramic polymer in which the component is shaped by a variety of standard composite fabrication techniques, such as filament winding, tape winding, and woven cloth winding. The process includes steps of passing ceramic fiber monofilament, tow, mat, or woven cloth through a solution of the thermoplastic photo-curable pre-ceramic polymer, applying ceramic fiber monofilament, tow, mat, or woven cloth to a moving flat substrate and using a heated or unheated compaction roller to press the thermoplastic pre-ceramic polymer coated ceramic fiber onto flat substrate. The process also includes the steps of using photo-light of the ultraviolet, visible, or infrared light spectrum to induce cross-linking (curing) of the photo-curable pre-ceramic polymer thereby rendering a thermoset polymer and either partially or completely pyrolyzing the now cured pre-ceramic polymer matrix coated ceramic fiber material. The pre-ceramic polymer poly(ethynyl)carbosilane yields silicon carbide upon pyrolysis. The pre-ceramic polymer may also yield oxide ceramic such as aluminum oxide upon pyrolysis. Other photo-curable pre-ceramic polymers may yield silicon nitride, aluminum nitride and titanium carbide, for example.

A first process of forming a photo-curable pre-ceramic polymer, poly(ethynyl)-carbosilane to silicon carbide ceramic includes the steps of reacting sodium acetylide with organo-chlorosilanes and condensing (polymerizing) the resultant organo-(ethynyl)chlorosilane product of step a with an excess of an alkali metal. The organochlorosilane is selected from a group of one or more of the following: dichlorodimethylsilane, trichloro-phenylsilane (tri-functional), and methyltrichlor.

A second process of forming a photo-curable pre-ceramic polymer, poly(ethynyl)-carbosilane to silicon carbide ceramic includes the steps of reacting sodium acetylide with organochloro-silanes and condensing (polymerizing) the resultant organo(ethynyl)-chlorosilane product of step a with an excess of an alkali metal sodium.

A third process of forming a photo-curable pre-ceramic polymer, poly(ethynyl)-carbosilane, to silicon carbide ceramic includes the steps of reacting sodium acetylide with a mixture of organodichlorosilanes and organo-trichlorosilanes and condensing (polymerizing) the resultant organo(ethynyl)-chlorosilane product of step a with an excess of an alkali metal.

A fourth process of forming a photo-curable pre-ceramic polymer, poly(ethynyl)-carbosilane to silicon carbide ceramic includes the steps of reacting a sub-stoichiometric amount of an alkali metal with organochloro-silanes and reacting the partially polymerized polyorganochlorosilane with sodium acetylide. The organochlorosilane is selected from a group consisiting of one or more of the following: dichlorodimethylsilane, trichlorophenylsilane (tri-functional) and methyltrichlorosilane.

A fifth process of forming a photo-curable pre-ceramic polymer, poly(ethynyl)-carbosilane to silicon carbide ceramic includes the steps of reacting a sub-stoichiometric amount of sodium metal with organochlorosilanes and reacting the partially polymerized polyorganochlorosilane with sodium acetylide.

A sixth process of forming a photo-curable pre-ceramic polymer, poly(ethynyl)carbosilane to silicon carbide ceramic includes the steps of reacting a sub-stoichiometric amount of an alkali metal with a mixture of organodichlorosilanes and organotrichlorosilanes and reacting the partially polymerized polyorganochlorosilane with sodium acetylide.

A seventh process of forming a photo-curable pre-ceramic polymer, poly(ethynyl)silazane, to silicon nitride ceramic includes the steps of reacting sodium acetylide with organochlorosilanes and condensing (polymerizing) the resultant organo(ethynyl)chlorosilane product of step a with ammonia.

An eighth process of forming a photo-curable pre-ceramic polymer, poly(ethynyl)-silazane to silicon nitride ceramic includes the steps of reacting sodium acetylide with organochlorosilanes and condensing (polymerizing) the resultant organo(ethynyl)-chlorosilane product of step a with ammonia.

A ninth process of forming a photo-curable pre-ceramic polymer, poly(ethynyl)silazane, to silicon nitride ceramic includes the steps of reacting sodium acetylide with a mixture of organodichlorosilanes and organotrichlorosilanes and condensing (polymerizing) the resultant organo (ethynyl)chlorosilane product of step a with ammonia. The organochlorosilane is selected from a group consisting of one or more of the following: dichlorodimethylsilane, trichlorophenylsilane (tri-functional) and methyltrichlorosilane.

A tenth process of forming a photo-curable pre-ceramic polymer, poly(ethynyl)-silazane to silicon nitride ceramic includes the steps of reacting a sub-stoichiometric amount of ammonia with organochlorosilanes and reacting the partially polymerized polyorganochlorosilazane with sodium acetylide.

An eleventh process of forming a photo-curable preceramic polymer, poly(ethynyl)-silazane to silicon nitride ceramic includes the steps of reacting a sub-stoichiometric amount of ammonia with organochlorosilanes and reacting the partially polymerized polyorganochlorosilazane with sodium acetylide.

A twelth process of forming a photo- curable pre-ceramic polymer, poly(ethynyl)-silazane to silicon nitride ceramic includes the steps of reacting a sub-stoichiometric amount of ammonia with with a mixture of organodichloro-silanes and organotrichlorosilanes and reacting the partially polymerized polyorganochlorosilazane with sodium acetylide.

A thirteen process for fabricating a ceramic matrix composites includes the steps of preparing a solution of thermoplastic photo-curable pre-ceramic polymer, passing a pre-preg through the solution of thermoplastic photo-curable pre-ceramic polymer, applying the pre-preg to a shaped mandrel, using light energy to induce cross-linking of the photo-curable pre-ceramic polymer after application to the mandrel whereby the thermoplastic pre-ceramic polymer is curved and pyrolyzing the cured thermoplastic pre-ceramic polymer matrix composite material.

From the foregoing it can be seen that processes of forming a photo-curable pre-ceramic polymer and their uses have been described.

Accordingly it is intended that the foregoing disclosure shall be considered only as an illustration of the principle of the present process.

What is claimed is:

1. A process of forming a UV curable preceramic polymer, poly(ethynyl)carbosilane comprising the steps of;
    a. reacting sodium acetylide with organochlorosilanes in order to generate an organo(ethynyl)chlorosilane product; and
    b. condensing said organo(ethynyl)chlorosilane product with an excess of an alkali metal.

2. A process of forming a UV curable preceramic polymer, poly(ethynyl)carbosilane comprising the steps of:
    a. reacting sodium acetylide with organochlorosilanes in order to generate an organo(ethynyl)chlorosilane product; and
    b. polymerizing said organo(ethynyl)chlorosilane product with an excess of the sodium.

* * * * *